March 12, 1940.　　　　J. PARSONS　　　　2,193,519
EFFECTIVE TEMPERATURE INDICATOR
Filed Sept. 4, 1937
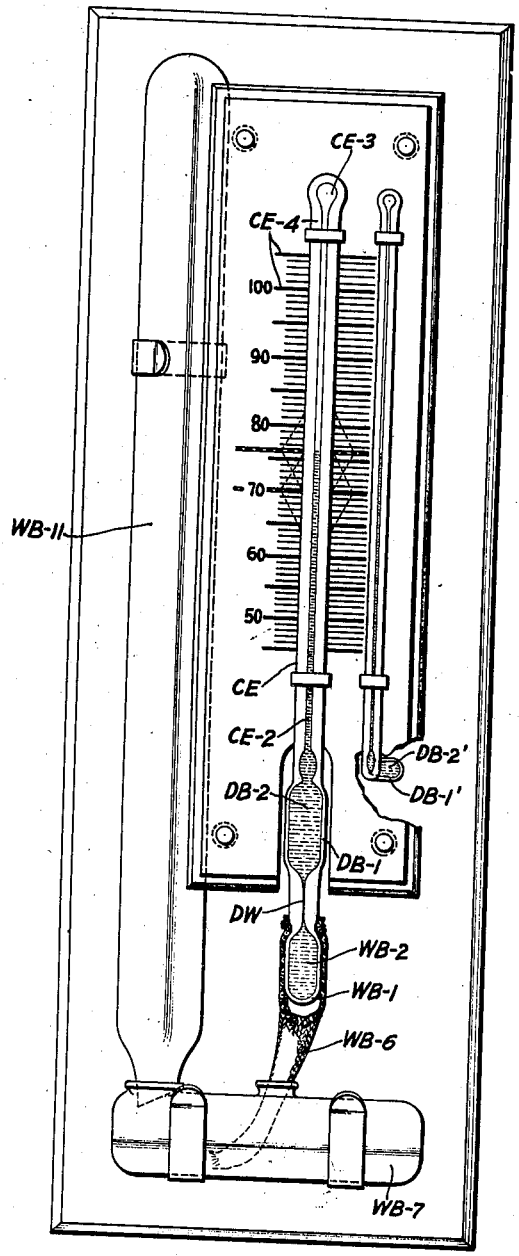
INVENTOR
John Parsons Patented Mar. 12, 1940

2,193,519

UNITED STATES PATENT OFFICE 2,193,519

EFFECTIVE TEMPERATURE INDICATOR

John Parsons, New York, N. Y.

Application September 4, 1937, Serial No. 162,536

7 Claims. (Cl. 73—338)

This invention relates to effective temperature indicators.

Effective temperature is an arbitrary index of the degree of warmth or cold felt by the human body in response to temperature, humidity and air movement. Effective temperature is not a temperature of the air only but is an index which combines temperature, humidity and air motion in a single value. The degree of warmth or cold a human body feels in response to the surrounding air depends upon three principal factors, temperature of the air, moisture content of the air and movement of the air.

With the rapidly expanding development of the control of these factors in so-called "air conditioning" for interior use, a keener interest and a better understanding of these factors by the general public is natural. There are numerous devices for ascertaining separately the degree of sensible heat, the relative humidity and movement of the air. By correlating these factors charts have been devised, such as the A. S. H. V. in co-operation with the Bureau of Mines, to produce what is called an "effective temperature" equivalent scale. To make proper use of this knowledge and apply it in a practical way has required the use of several instruments plotted against charts, requiring careful computation, with always the chance of human error. A device that automatically correlates these values into a single factor denoting the net effect is highly desirable. It is a well understood fact that a wet bulb thermometer reads higher in still air, due to the aura of denser humidity directly surrounding it, against air in motion, which dissipates this aura. This depends to some extent on the shape of the wet bulb, a spherical bulb producing a larger aura than an elongated bulb. The human body has a function similar to this action, in the dissipation of latent heat of evaporation by means of the pores, and likewise depends upon the relative humidity and air motion. Contrary to general practice, but substantiated by the highest authorities, a wet bulb, if it is to indicate the true effect of the conditions as related to human comfort, should be read without superinducing additional air movement beyond that which prevails normally.

An object of this invention is a simple, inexpensive and efficient device which automatically correlates air temperature, relative humidity and air motion into a single numerical index based on a predetermined valuation in respect to the response the human body makes to each.

In an instrument embodying the invention, an expansible member sensitive to sensible heat is connected in series with an expansible member sensitive to latent heat and means are provided for indicating the combined expansion of the said members. Preferably, the instrument comprises a capillary tube having an expansion chamber at one end and a pair of reservoirs interconnected by a capillary passage with one reservoir connected to the remaining end of the capillary tube. Both reservoirs and the interconnecting passage are filled with a thermally sensitive liquid such as mercury and one reservoir is enclosed with a wick saturated with water. The thermally sensitive liquid in one reservoir is thus responsive to sensible heat as a dry bulb thermometer, while the thermally sensitive liquid in the other reservoir is sensitive to relative humidity and air motion as in a wet bulb thermometer. In connection with the capillary tube there is provided a properly graduated scale, by means of which the composite pressure of the two reservoirs is indicated as a single index value of comfort in respect to the combined effects of temperature relative humidity and air movement according to a predetermined formula.

The numerical index for the composite value of the combined effects of temperature, relative humidity and air motion, as they react upon the human body, is fixed by the dry bulb temperature at some predetermined relative humidity and air motion which induces a sensation of warmth or cold like that of the given condition. It will be readily seen that the proportional value of relative humidity and air motion in this predetermined formula can be fixed by the size of the wet bulb in relation to the size of the dry bulb. Without limiting the invention to any specific proportional value between the factors of temperature, relative humidity and air motion and consequent relative size between the wet bulb and the dry bulb, and with the sole object of more clearly illustrating the novelty of the invention and based upon experiments and calculations, it is preferred to use the proportion of 40% for the wet bulb and 60% for the dry bulb in their relation to the total composite value. For determining the basic relative humidity and air motion, at which the dry bulb temperature shall indicate the numerical index value a scale is calibrated from 50 to 100 as follows: Taking 50% relative humidity as a preferred basis, it being nearer normal for the greater part of the temperature zone, and still air (turbulence of 15 to 25 F. P. M.) one of the bulbs is subjected to a 42° temperature and the other to a 50° temperature. The point on the capillary column at which the meniscus of the volatile liquid stands is arbitrarily numbered 50. As this is the combination of wet and dry bulb temperature at 50% relative humidity, at 50° air temperature, it will be seen that by encasing one bulb with a moistened cloth and submitting both bulbs to a 50° air temperature and a relative humidity of 50%, the meniscus of the composite column will stand at the same mark of 50. This will also be true if repeated for 60°, 70°, 80°, 90° and 100° dry bulb temperatures with corresponding wet bulb temperatures for 50% relative humidity and also for all intermediate air temperatures. If the air is still, the meniscus in the capillary composite column will stand higher for each air temperature at 50% relative humidity on account of a rise in the wet bulb temperature due to an increased relative humidity directly surrounding the wet bulb. This corresponds to a similar reaction of the human body under still air conditions as contrasted to air motion and fairly reflects degrees of comfort under varying air motion at the same relative humidity and air temperature.

Having shown how the three separate values of air temperature, relative humidity and air motion are here combined, so that they may be indicated by a single composite numerical value based upon a predetermined formula of dry bulb temperature and relative humidity, it is highly important that there should be some simple means embodied in the device and a part of its fundamental scheme whereby the formula on which the numerical index value of per cent relative humidity to dry bulb temperature can be determined. This may be carried out in several ways, one of which is herein illustrated, wherein a dual bulb thermometer, one of which acts as a dry bulb and the other as a wet bulb is calibrated to indicate on a common scale with a separate dry bulb thermometer the same degree as the air temperature when a predetermined per cent relative humidity exists and to indicate a higher degree than the air temperature to the extent the relative humidity is higher than the predetermined percent and to indicate a lower degree than the air temperature to the extent relative humidity is below the predetermined per cent. In this novel combination, it will be readily seen that the separate dry bulb thermometer is an integral part of the completed device as it acts to indicate the dry bulb temperature of the dual thermometer. A decided advantage as derived from this system is that both are indicated on the same scale and they are more readily appraised in their respective positions. Relative humidity above and below the predetermined level is quickly observed and greater accuracy is possible. Without some means of indicating air temperature against which to compare the composite indications of the dual thermometer, relative humidity could not be indicated and a valuable feature of the invention would be missing. By the arrangement herein described, a simple formula for the scale gives the predetermined per cent relative humidity at which both the dual thermometer and the separate dry bulb thermometer are level at the same degree and what per cent relative humidity to add or subtract per degree difference the composite column is above or below the separate dry bulb thermometer. As in the preferred 50% relative humidity basis, wherein red toluol is used in the dual thermometer, and blue toluol in the single thermometer, the formula is: normal humidity (50% saturation), red level with blue; high humidity, red above blue 50% plus 8% per degree difference; low humidity, red below blue, 50% minus 8% per degree difference.

Other objects, novel features and advantages of this invention will become apparent from the following specification and accompanying drawing, wherein the single figure is a front elevation of an instrument embodying the invention.

A capillary tube CE is suitably supported by a panel and is provided at its upper end with an expansion chamber CE—3. Connected to the lower bottom of the capillary tube is a reservoir DB—1 which communicates through a capillary passage DW with a second reservoir WB—1. The reservoir WB—1 contains a body of expansible liquid WB—2 and the reservoir DB—1 contains a body of expansible liquid DB—2, while the passageway DW is likewise filled with expansible liquid. A column of expansible liquid CE—2 extends upwardly from the body of expansible liquid DB—2 into the capillary tube CE. A wick WB—6 extends into a receptacle WB—7 which contains water, the latter being maintained at a constant level from the supply tube WB—11. On the panel are provided scale indications CE—4. Also supported on the panel is a dry bulb thermometer DB—1' containing a volatile element DB—2' proportioned to indicate proper sensible heat temperature by the same intervals as the scale CE—4. This is made possible by the fact that there is a uniform rise of 8.25° wet bulb for each 10° dry bulb from 50 to 100° F. at 50% relative humidity so that the following relation exists: at 50° dry bulb 42° wet bulb; at 60° dry bulb 50.25° wet bulb; at 70° dry bulb 58.5° wet bulb; at 80° dry bulb 66.75° wet bulb; at 90° dry bulb 75° wet bulb and at 100° dry bulb 83.25° wet bulb. It will be seen that as there is a uniform rise in the wet bulb temperature in proportion to the rise in the dry bulb temperature, there can be plotted a differential co-efficient value for a composite scale against which a properly proportioned dry bulb thermometer using volatile fluid with the same co-efficient of expansion may be made to read on the common scale.

The body of expansible liquid DB—2 changes in volume in response to sensible heat variations while the body of expansible liquid WB—2 changes in volume in response to latent heat variations. The combined effect of the volume changes in the two bodies of expansible liquid determines the height of the expansible liquid column CE—2 which is a measure of the effective temperature. By reference to the scale CE—4, the index of effective temperature may be read directly.

Relative humidity may readily be determined by comparison of the readings on the dry bulb or air thermometer DB—1' and the effective temperature thermometer CE. The effective temperature column is calibrated to read the same as the air temperature thermometer under normal conditions of 50% relative humidity and moderate air motion (normal refrigeration). As relative humidity increases above 50% there is a corresponding increase in effective temperature over the air temperature due to less refrigeration of the wet bulb because of reduced evaporation. As relative humidity decreases below 50% there is a corresponding decrease in effective temperature below the air temperature due to greater refrigeration of the wet bulb because of increased evaporation. Any increase over a moderate air motion up to 150 feet per minute will increase refrigeration of the wet bulb and indicate a still further decrease in effective temperature because of the more rapid evaporation by the wet bulb.

While the invention has been disclosed as embodied in an instrument composed of wet and dry bulbs, it is to be understood that various other types of devices sensitive to sensible heat and to latent heat or the moisture content of the air may be utilized without departing from the scope of the invention. Also, various structural modifications may be made in the embodiment shown without departing from the spirit of the invention as defined in the appended claims.

I claim:

1. A device of the character described comprising a capillary tube having an expansion chamber at one end, a first reservoir connected to the other end of said capillary tube, a second reservoir connected to said first reservoir through a capillary passage, thermally sensitive liquid in both said reservoirs and passage and extending into said capillary tube, and means for rendering the liquid in one of said reservoirs responsive to latent heat.

2. A device of the character described comprising a capillary tube having an expansion chamber at one end, a first reservoir connected to the other end of said capillary tube, a second reservoir connected to said first reservoir through a capillary passage, thermally sensitive liquid in both said reservoirs and passage and extending into said capillary tube, and means for rendering the liquid in said second reservoir responsive to latent heat.

3. A device according to claim 1 in which a scale is associated with said capillary tube and a dry bulb thermometer is associated with said scale, the thermally sensitive element of said dry bulb thermometer having the same co-efficient of expansion as said thermally sensitive liquid and the composite expansion of the liquid in said reservoirs being indicated as a simple numerical index coincident with the air temperature index at predetermined percent relative humidity.

4. A device of the character described comprising two interacting expansible members, one being responsive to sensible heat and the other being responsive to relative humidity, means including a scale for indicating sensible heat temperature, and means for indicating on the same scale the combined action of said expansible members as a single numerical index coincident with the sensible heat temperature at a predetermined percent relative humidity.

5. A device of the character described comprising a capillary tube having an expansible chamber at one end, a pair of interconnected reservoirs of which one is connected to the remaining end of said capillary tube, said reservoirs being filled with thermally sensitive liquid and a column of thermally sensitive liquid extending into said capillary tube, a wick surrounding one of said reservoirs, and means for supplying moisture to said wick.

6. A device according to claim 5 wherein a scale is associated with said capillary tube and a dry bulb thermometer is associated with said scale, the co-efficient of expansion of the sensitive element of said dry bulb thermometer being the same as said liquid and the composite expansion of the liquid in said reservoirs being indicated as a simple numerical index coincident with the air temperature index at predetermined percent relative humidity.

7. A device of the character described comprising a dual bulb thermometer, one bulb of which is responsive to sensible heat and the other being encased with a moistened wick to be responsive to latent heat and air motion, a dry bulb thermometer, and a common scale for said dual bulb and dry bulb thermometers by which is indicated the composite expansion of the dual bulb thermometer as a single numerical index coincident with the air temperature index at a predetermined percent relative humidity and air motion.

JOHN PARSONS.